June 8, 1943.  C. E. JOHNSON  2,321,028
COUPLING DEVICE
Filed July 28, 1942
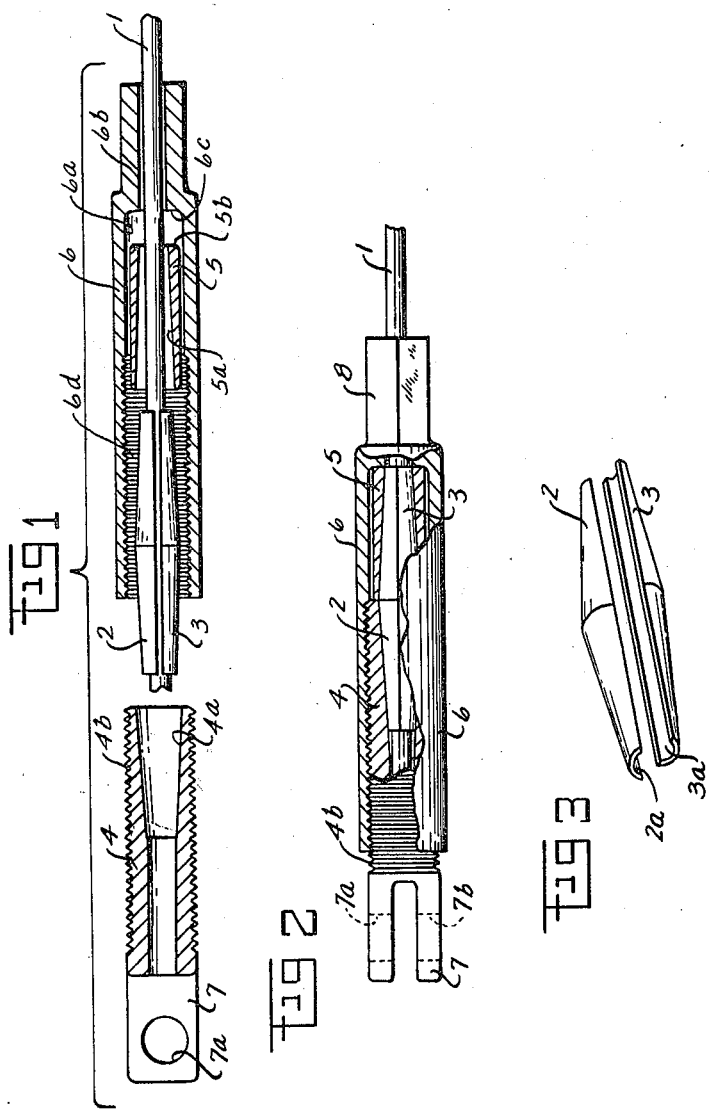
INVENTOR
CLIFFORD E. JOHNSON Patented June 8, 1943

2,321,028

UNITED STATES PATENT OFFICE 2,321,028

COUPLING DEVICE

Clifford E. Johnson, Medway, Ohio

Application July 28, 1942, Serial No. 452,617

2 Claims. (Cl. 287—114)

(Granted under the act of March 3, 1883, as amended April 30, 1928; 370 O. G. 757)

The invention described herein may be manufactured and used by or for Government for governmental purposes, without the payment to me of any royalty thereon.

This invention relates to coupling devices designed particularly for use in joining various types of operating connections to a cable or the like.

Coupling devices of the type of the invention have been heretofore proposed in the art, as illustrated by Patent Nos. 2,210,058, issued August 6, 1940, and 2,041,385, issued May 19, 1936.

It is an object of the present invention to provide a coupling device of the type mentioned which is so constructed as to eliminate twisting of the cable in the process of joining the coupling device thereto.

A further object of the invention is to provide a coupling device of the type mentioned which is of extremely simple construction requiring no special tools or solder in connection with its use and generally to improve the construction of coupling devices of this type.

The coupling device of the present invention comprises a pair of holding members having oppositely disposed tapered sockets adapted to cooperate with a sleeve composed of a plurality of clamping members engageable with a cable or the like, the ends of the sleeve being tapered to fit snugly in the sockets of said holding members for maintaining the sleeve in clamping engagement with the cable, and a coupling member adapted for detachable interlocking connection with one of the holding members. This coupling member is designed to embrace the other holding member in such a manner as to engage one end only thereof and move the same axially respecting the cable to draw the holding members toward each other in cooperation with the sleeve.

In the drawing:

Fig. 1 is a sectional view of a device embodying my invention, certain of the parts shown in separated relation for greater clarity;

Fig. 2 is a partial sectional view of said device, showing the same in a coupled relation to a cable;

Fig. 3 is a perspective view of a two-part clamping sleeve employed in the device of my invention.

Referring to the drawing for a detailed description of the invention, the numeral 1 designates a cable or wire to which the coupling device is adapted to be joined; 2 and 3 designate cooperating sections of a clamping sleeve, said sections being provided with arcuate recesses 2a and 3a respectively, extending longitudinally and designed to receive the cable 1. When these sleeve sections 2 and 3 are assembled in conjunction with a cable 1, as shown in Figs. 1 and 2, they comprise a clamping sleeve each end of which is tapered so as to have a smaller diameter at its extremity.

For the purpose of maintaining the sleeve sections 2 and 3 in clamping engagement with the cable 1, there are provided holding members 4 and 5 cooperable with opposite ends of the sleeve comprising the sleeve sections 2 and 3. These holding members 4 and 5 are provided with axial bores 4a and 5a which are flared at their ends to provide conical sockets having a configuration closely conforming to the respective conically tapered ends of the sleeve comprising the sleeve sections 2 and 3. The holding members 4 and 5 are disposed with the flared wider ends of their sockets 4a and 5a facing each other so that each holding member may receive in its flared socket one tapered end of the sleeve comprising the sleeve sections 2 and 3. The cable 1 to which the coupling device is desired to be joined extends axially through the bore 5a of the holding member 5.

When the sleeve sections 2 and 3 are engaged with the cable 1 as shown in Figs. 1 and 2 and the holding members 4 and 5 assembled in conjunction therewith, the respective conical sockets 4a and 5a fit snugly over the respective ends of the sleeve comprising the sleeve sections 2 and 3 so as to clampingly engage said sleeve sections with the cable.

A tubular coupling member 6 is provided with a bore 6a of somewhat larger diameter then the holding member 5 so as to receive the latter interiorly of said bore 6a of the coupling member 6. The bore of the coupling member 6 is reduced in diameter as indicated at 6b so as to provide a shoulder 6c for engaging the inner end 5b of the holding member 5. The portion 6b of the bore of the coupling member 6 is of sufficiently large diameter to accommodate the cable 1. A portion of the bore 6a of the coupling member 6 is threaded as indicated at 6d for cooperation with the exteriorly threaded portion 4b of the holding member 4.

The holding member 4 may be provided either with an operating handle or with a bifurcated shackle end 7 as shown, having transverse holes 7a and 7b for receiving a pin or bolt (not shown) to facilitate the securing of an operating connection to the holding member 4.

The coupling member 6 may be provided with a polysided portion 8 for enabling a wrench to be engaged therewith for tightening the same in its threaded connection with the holding member 4 and likewise the latter may be provided with a polysided portion for engagement with a wrench, if the shackle portion 7 is not employed.

In the use of my invention, the cable 1 to which the coupling device is to be connected is inserted through the bore 6b of the coupling member 6 from right to left, having reference to Fig. 1, thence through the bore 5a of the holding member 5 which is positioned within the bore 6a of the coupling member 6. Next, the sleeve sections 2 and 3 are caused to engage the cable 1 as indicated in Fig. 1 and the holding member 4 moved axially respecting the cable so that the flared socket 4a snugly fits over the respective flared end of the sleeve comprising the sleeve sections 2 and 3. Now the coupling member 6 may be screwed on to the holding member 4 and this will serve to move the holding member 5 axially of the cable 1 in a leftward direction, having reference to Fig. 1, by engagement of the interior shoulder 6c of the coupling member 6 with the end 5b of the holding member 5, so that the tapered socket 5a of the latter is caused to fit snugly over the respective end of the sleeve comprising sleeve sections 2 and 3. Thus the holding members 4 and 5 are drawn axially toward one another and the tapered ends of the sleeve become tightly seated in the flared sockets 4a and 5a of the holding members 4 and 5 so that the sleeve sections 2 and 3 are clampingly engaged very securely with the cable wire.

It is to be particularly noted that the inner diameter of the bore 6a of the coupling member 6 is larger than the outer diameter of the holding member 5 so that there is no engagement of the periphery of the member 5 with the member 6, the end 5b being the only part of the member 5 engaged by the member 6. This is an important feature of the construction because it enables the holding members 4 and 5 to be drawn together in cooperative relationship with the sleeve, by screwing the coupling member 6 on to the member 4, without causing the cable to be twisted as would be the case if the member 6 were to frictionally engage the periphery of the member 5.

From the foregoing it will be apparent that the invention provides a very simple construction of coupling devices having a minimum number of parts readily assembled for coupling the same to a cable without the use of any special tools or solder, it being only necessary to use ordinary wrenches for engaging the polysided portion 8 of the coupling member 6 to screw the same on to the holding member 4 while the latter is held stationary by use of a wrench or by any other suitable means.

Having now described my invention and the manner in which the same may be used, what I claim as new and desire to secure by Letters Patent is:

1. A coupling device of the class described comprising, in combination, a pair of holding members, each having a tapered socket therein, said members having their sockets axially disposed in reverse relationship respecting one another so that the flared wider ends of said sockets face each other, a pair of clamping members adapted to clamp a cable or the like between them and when so engaged forming a plural part sleeve with each end thereof oppositely tapered to fit snugly in one of said sockets respectively, and a coupling member adapted for detachable interlocking connection with one of said holding members, said coupling member having an axial bore within which the other holding member is entirely received, said bore being of sufficiently large diameter that there is no peripheral engagement of said coupling member and said other holding member when the latter is so received and in cooperative relation to said clamping members with the latter clampingly engaged with said cable, said coupling member having an internal annular shoulder in said bore axially engageable with an end edge only of said other holding member in moving the same axially of the cable to draw said holding members toward one another in cooperative relation with said sleeve.

2. A coupling device of the class described comprising, in combination, a pair of sleeve holding members each having a conical socket therein, said members having their sockets axially disposed in reverse relation respecting one another so that the flared wider ends of said sockets face each other, a pair of clamping members adapted to clampingly engage a cable or the like extending between them and when so engaged forming a plural part sleeve with each end thereof having an opposite conical taper adapted to fit snugly in one of said sockets respectively, said clamping members being separable from one another radially respecting the axis of the cable, one of said holding members being adapted to embrace the cable, and a coupling member adapted for threaded cooperation with one of said holding members, said coupling member having an axial bore within which the other holding member is entirely received, said bore being of sufficiently large diameter that there is no peripheral engagement of said coupling member and said other holding member when the latter is so received and in cooperative relation to said clamping members with the latter clampingly engaged with said cable, said coupling member having an internal annular shoulder in said bore axially engageable with an end edge only of said other holding member in moving the same axially of the cable to draw said holding members toward one another and force the respective sleeve ends tightly into their respective sockets, thereby causing the clamping members to tightly grip the cable.

CLIFFORD E. JOHNSON.